United States Patent [19]

Takagi

[11] Patent Number: 5,111,503
[45] Date of Patent: May 5, 1992

[54] PORTABLE TELEPHONE SET
[75] Inventor: Hisamitsu Takagi, Inagi, Japan
[73] Assignee: Fujitsu Limited, Kawasaki, Japan
[21] Appl. No.: 741,630
[22] Filed: Aug. 7, 1991
[30] Foreign Application Priority Data
   Aug. 7, 1990 [JP] Japan ............. 2-207599
[51] Int. Cl.$^5$ .......... H04M 1/00; E05D 7/10; E05D 11/10; E05F 1/08
[52] U.S. Cl. .......... 379/433; 16/260; 16/296; 16/336
[58] Field of Search .......... 379/433, 434; 16/260, 16/296, 336; 403/93; 455/89, 90

[56] References Cited
U.S. PATENT DOCUMENTS

| | | | |
|---|---|---|---|
| 770,595 | 9/1904 | Lovette | 16/260 |
| 1,095,701 | 5/1914 | Bronson | 16/296 |
| 4,018,998 | 4/1977 | Wegner | 379/433 |
| 4,645,371 | 2/1987 | Wang | 403/93 |
| 4,845,772 | 7/1989 | Metroka et al. | 379/433 |
| 4,897,873 | 1/1990 | Beutler et al. | 379/433 |

FOREIGN PATENT DOCUMENTS

| | | | |
|---|---|---|---|
| 0164743 | 8/1988 | Japan | 379/434 |
| 63-164743 | 8/1988 | Japan | 379/434 |

*Primary Examiner*—Jin F. Ng
*Assistant Examiner*—Huyen D. Le
*Attorney, Agent, or Firm*—Staas & Halsey

[57] ABSTRACT

A portable telephone set having a cover attached rotatably to a body. When closed, the cover covers and protects a switch portion of the telephone set, while when opened, it is held in a stable position at a predetermined angle relative to the body by means of a cover holding mechanism. The cover is held with respect to the body by the cover holding mechanism so that the cover is disengaged from the body when it is about to be opened forcibly beyond an allowable range of its rotation. Since the cover when opened can function as a sound collector, it is possible to provide a microphone on the body side and attain the reduction in size of the portable telephone set.

6 Claims, 5 Drawing Sheets

PORTABLE TELEPHONE SET

FIELD OF THE INVENTION

The present invention relates generally to a portable telephone set and particularly to a case structure of a portable telephone set having a cover. The term "portable telephone set" as used herein includes general cordless telephone sets.

BACKGROUND OF THE INVENTION

It goes without saying that an ultimate object of communication is to transmit or exchange one's will or information immediately to anyone any time from anywhere. In addition to the conventional fixed point-to-point communication, a mobile communication has been being developed gradually. The mobile communication is a communication between a moving body (including man) such as ship, automobile or aircraft and a general subscriber's station or an office and it is also a communication between moving bodies. Recently, portable telephone and cordless telephone which belong to the mobile communication have been developed actively.

In general, one uses a telephone set while holding the receiver to his ear and holding the transmitter in a position lose to his mouth, so even in the case of a portable telephone set it is necessary to ensure a sufficient distance between the receiver and the transmitter, thus resulting in that the portable telephone set itself has heretofore been somewhat long and large in size.

There has also been proposed a portable telephone set provided with a folding cover for protecting a switch portion of a portable telephone set. In this case, a microphone is provided on the cover side to ensure a sufficient distance between the speaker and the microphone.

Thus, in the conventional portable telephone set, the receiver and the transmitter both provided in the telephone set body are spaced apart by a distance approximately equal to the ear-mouth distance of the user, so there has been the problem that the reduction in size cannot be attained to a satisfactory extent. The manufacturing techniques for the constituent parts of portable telephone sets have advanced and it has become possible thereby to supply parts which are smaller in size and less expensive. From this standpoint it is relatively easy to attain the reduction in size of portable telephone sets. However, since there is a request from a human engineering stand that a distance approximately equal to the ear-mouth distance should be ensured between the receiver and the transmitter, this has been an obstacle to the reduction of size.

In the case of a portable telephone set having a folding cover which has been proposed heretofore, since a microphone is provided on the cover side, there has been the problem that the microphone cord is apt to be broken as a result of repeated opening and closing of the cover.

Accordingly, it is an object of the present invention to overcome the above-mentioned problems of the prior art and provide a portable telephone set capable of ensuring a sufficient distance between the receiver and the transmitter during use of the telephone set even if the size of the telephone set body is reduced to a sufficient extent.

It is another object of the present invention to provide a portable telephone set capable of protecting a switch portion while not in use and capable of improving the S/N characteristic in the transmitter.

SUMMARY OF THE INVENTION

In accordance with an aspect of the present invention there is provided a portable telephone set comprising a body provided with a speaker, a microphone and switch means; a cover attached pivotably to the body, said cover when closed being adapted to cover at least the switch means and when opened function as a reflective sound collector for the microphone; stopper means provided in the body to inhibit the cover from rotating at an angle larger than a predetermined angle relative to the body; and cover holding means for holding the cover pivotably within the predetermined angle relative to the body, the cover holding means including biasing means for holding the cover in a stable position in the rotating direction of the cover when the cover is opened, and the cover holding means permitting the cover to be disengaged from the body when the cover is about to be opened forcibly against the stopper means.

When the cover is opened for use of the telephone set, it is held in a stable position inclined at another predetermined angle (e.g. 145°) relative to the body by the cover holding means. In this stable position, the cover can be functioned as a reflective sound collector.

This portable telephone set is used while the cover is held at the above another predetermined angle relative to the body, but when the portable telephone set is placed on a flat surface such as the surface of a desk with the switch means facing down and in this state a load is applied to the telephone set from the side opposite to the switch means, the cover opens along the flat surface to prevent breakage of the cover. Upon removal of the load or when the portable telephone set is lifted, the cover returns automatically to its original inclined state.

However, if the cover is about to be rotated forcibly beyond the foregoing predetermined angle, it is likely that the cover will be damaged. In the present invention, when the cover is about to be turned forcibly beyond the predetermined angle relative to the body, it is disengaged from the body, so there is no fear of damage to the cover even in the event an undesired load which acts to rotate the cover forcibly is applied to the cover.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
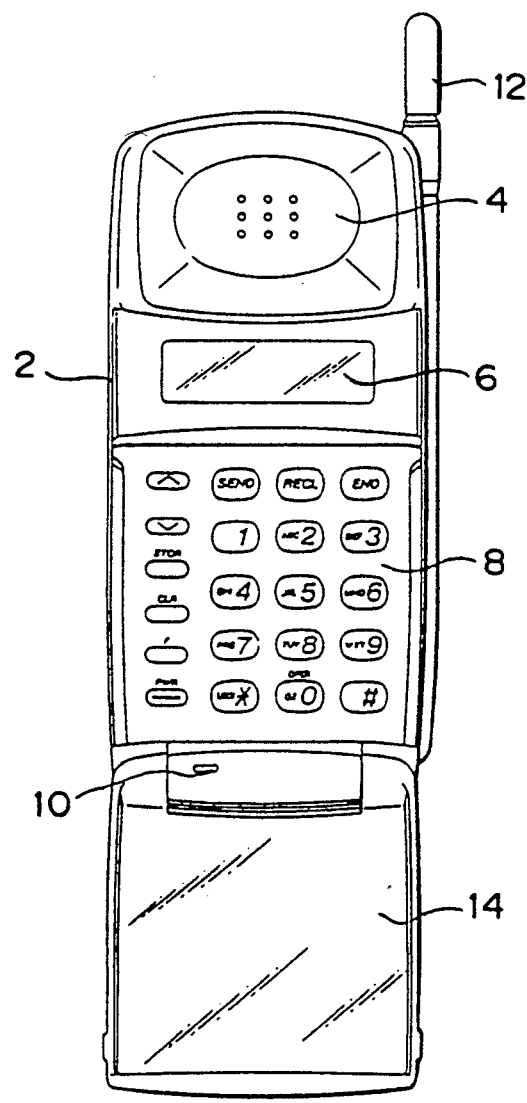
FIG. 1 is a plan view of a portable telephone set embodying the present invention.
Figure 2:
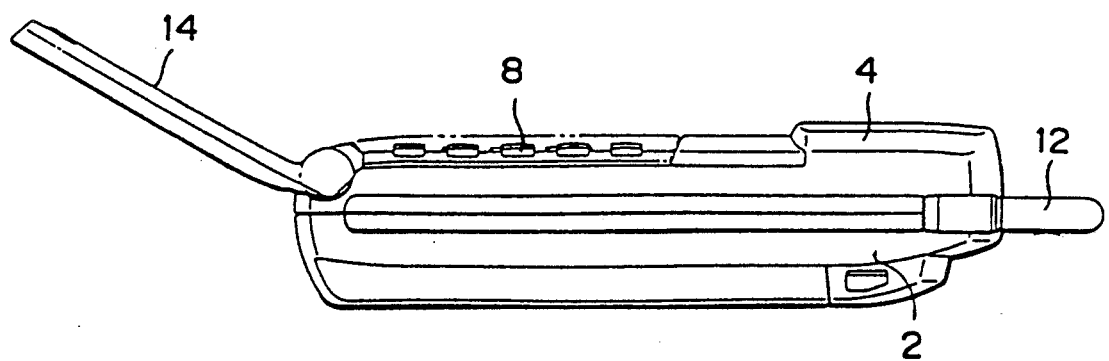
FIG. 2 is a side view thereof.

Referring first to FIGS. 1 and 2, an explanation will now be made about a schematic arrangement in a portable telephone set according to the present invention. In FIGS. 1 and 2, the portable telephone set is shown with a cover opened. At an upper end portion of a portable telephone set body 2 there is provided a receiver portion 4 with a speaker accommodated in the interior. At a middle portion of the body 2 there are provided a display portion 6 such as a liquid crystal display for example and a switch portion 8 having a dialing function, etc. Further, at the leftmost end of the lower end portion of the body 2 there is provided a transmitter portion 10 with a microphone accommodated in the interior. The reason why the transmitter portion 10 is disposed not centrally of the lower end portion of the body 2 but at the leftmost end thereof is because it is intended to maximize the distance between the receiver portion 4 and the transmitter portion 10 in the portable telephone set body 2 which is reduced in size.

The reference numeral 12 denotes an antenna attached to a side portion of the body 2 so that it can be pulled out. A cover 14 is mounted pivotably to the body 2 in a position close to the lower end of the body. When closed, the cover 14 covers at least the switch portion 8, while when opened, it functions as a reflective sound collector for the microphone. Although the cover 14 is mounted pivotably to the body 2, it is held stably in a position inclined a predetermined angle relative to the body 2 by means of a cover holding mechanism which will be described rater.

Figure 3:
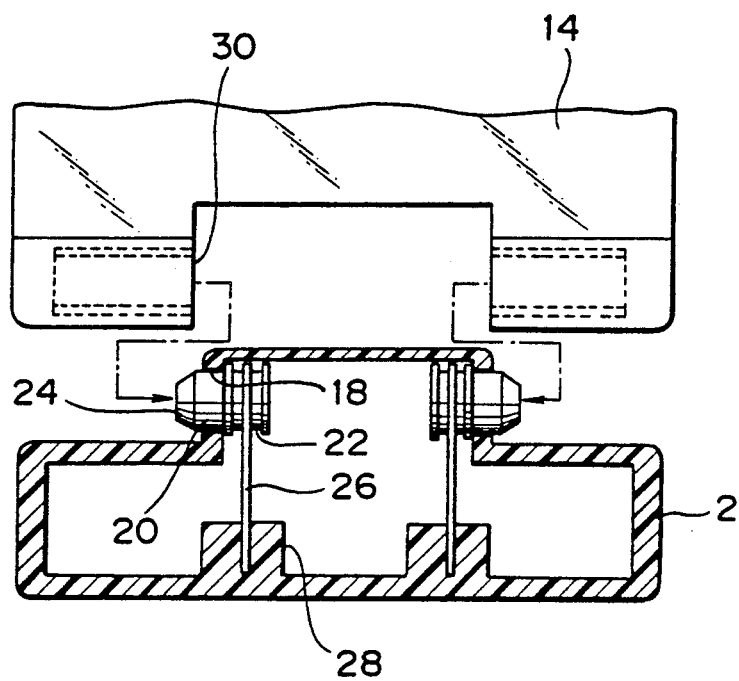
FIG. 3 is a schematic sectional view illustrating a first embodiment of a cover holding mechanism.

Referring now to FIG. 3, which is a schematic sectional view showing an embodiment of a cover holding mechanism, the cover 14 is illustrated in a removed state from the body 2. The cover 14 is mounted to the body 2 as indicated by arrows. In this embodiment a pair of cover holding mechanisms are formed at both side portions of the body 2 and both are symmetric with each other, so the construction of only one cover holding mechanism will be described below.

Figure 4:
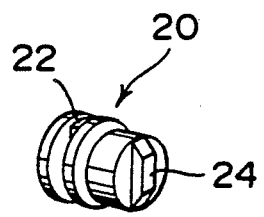
FIG. 4 is a perspective view of a pivot shaft member used in the first embodiment.

The reference numeral 18 denotes a circular hole formed in the transmitter-side end portion of the body 2, and a pivot shaft member 20 is inserted into the hole 18 so as to be rotatably and axially slidably therein. The pivot shaft member 20 is formed with a plate-like portion 22 on the interior side of the body 2, while on the exterior side of the body 2 the pivot shaft member 20 is formed with a protuberance 24 having a trapezoidal section (see FIG. 4). Reference numeral 26 denotes a U-shaped spring which clamps the plate-like portion 22 of the pivot shaft member 20. The U-shaped spring 26 is fixed removably to a projection formed on the body 2, and an axial pressure, or a thrust load, acting from the inside toward the outside, is exerted on the pivot shaft member 20 by the U-shaped spring 26.

Figure 5:
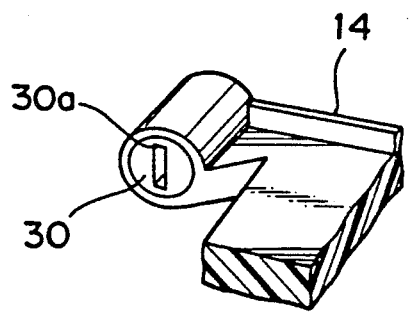
FIG. 5 is a partially cut-away perspective view of a cover provided with a bearing member used in the first embodiment.

On the other hand, as best seen in FIG. 5, a bearing member 30 is inserted and fixed to the end portion of the cover 14. The protuberance 24 of the pivot shaft member 20 is inserted into the bearing member 30 so that the bearing member rotates integrally with the pivot shaft member 20 at the time of opening and closing of the cover. The bearing member 30 has a rectangular hole 30a for insertion therein of the protuberance of the pivot shaft member 20.

Figure 6:
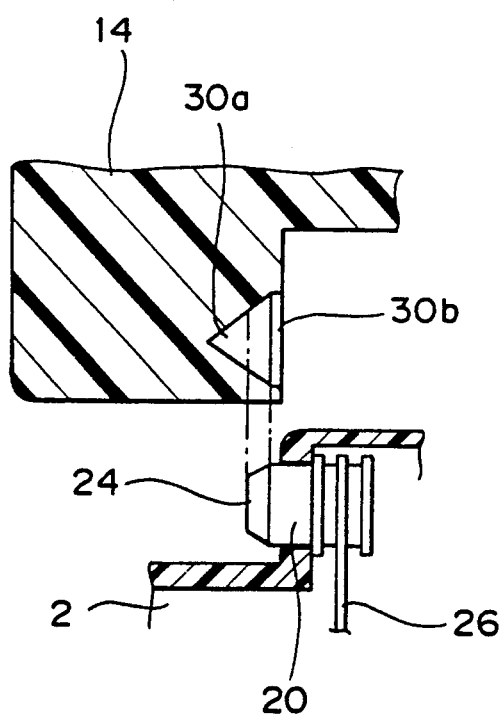
FIG. 6 is a sectional view showing the details of the pivot shaft member and the bearing member both used in the first embodiment.

As shown in FIG. 6, the rectangular hole 30a is tapered in an extended shape of the trapezoidal protuberance 24 of the pivot shaft member 20. When both are fitted together, the slant faces of the protuberance 24 come into conformity with the tapered portions of the rectangular hole 30a, whereby radial displacement and wobbling can be prevented. A recess indicated at 30b is a circular recess, into which is fitted the cylindrical portion of the pivot shaft member 20. At the interface between the cylindrical portion and the protuberance of the pivot shaft portion 20 there is formed an end face which is perpendicular to the paper surface. This end face comes into abutment with a similar end face formed at the interface between the circular recess 30b and the rectangular hole 30a both formed in the cover 14, and the cylindrical portion of the pivot shaft member 20 is fitted in the circular recess 30b. This fitting length is not so long and is not an obstacle to the disengagement of the cover 14 from the body in the event of occurrence of some trouble. By the presence of this fitting portion the cover 14 is connected to the body stably and securely.

Figure 7A:
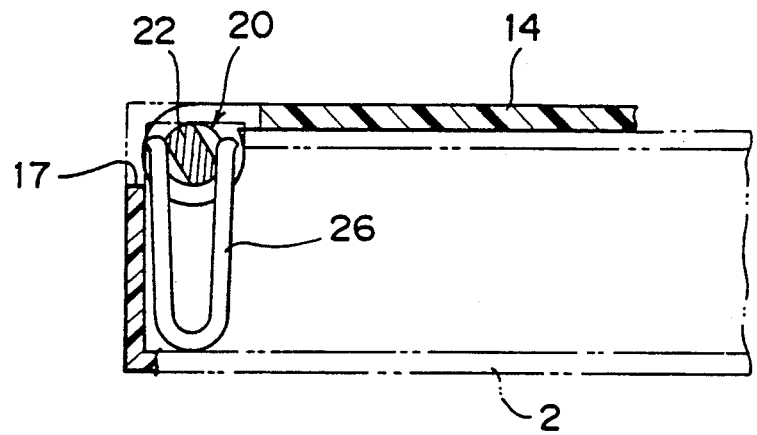
FIGS. 7A to 7C are views explanatory of opening and closing operations of the cover.

Now, the cover opening and closing operation in the above embodiment will be described with reference to FIGS. 7A to 7C. FIG. 7A shows the cover 14 in a closed state, FIG. 7B shows the cover 14 in an opened state in a stable position, and FIG. 7C shows the cover 14 which is about to be rotated forcibly against a stopper wall provided in the body 2.

In this embodiment, as shown in FIG. 7, when the U-shaped spring 26 is in close contact with two flat faces of the plate-like portion 22 of the pivot shaft member 20, the cover 14 is held in a position inclined by 145° relative to the body 2, and this position is a stable position of the cover 14. The reason why the cover 14 assumes such stable position when opened is because the S/N characteristic in the transmitter portion becomes maximum when communication is made with the cover in an opened state in the stable position.

On the other hand, if the stable position of the cover 14 is set in a 145° inclined position of the cover 14 relative to the body 2, the biasing force in the closing direction of the U-shaped spring 26 acts to push the cover 14 against the body 2 through the platelike portion 22 of the pivot shaft member 20 when the cover is closed as shown in FIG. 7A. Thus, it is not necessary to use a lock mechanism for maintaining the closed state of the cover 14, and the operability is extremely good in practical use.

Figure 7B:
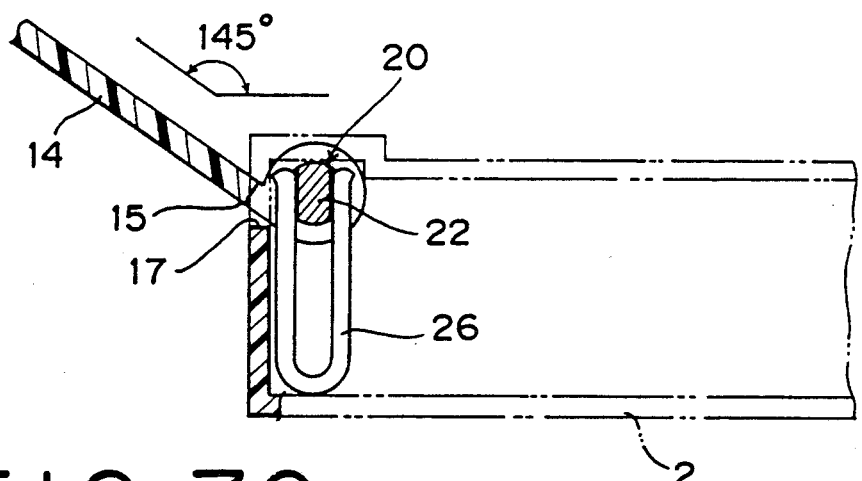
Figure 7C:
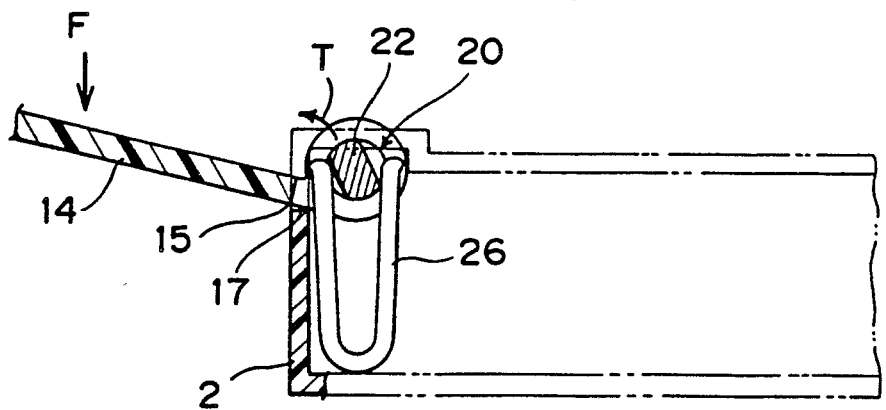

When the cover 14 is further opened from the state of FIG. 7B and assumes its state shown in FIG. 7C, a corner 15 of the cover 14 comes into abutment with a stopper wall 17 of the body 2 and serves as a rotating fulcrum. In this state, the plate-like portion 22 of the pivot shaft 20 assumes about the same angular position as in FIG. 7A, and when a further excessive force F acting in the opening direction is applied to the cover 14, a rotating force in the direction of arrow T is created in the cover 14 with the corner 15 as a rotating fulcrum, so that the bearing member 30 of the cover slides on the tapered faces of the protuberance 24 of the pivot shaft member 20 and is disengaged from the protuberance 24, whereby the cover 14 is removed from the body 2 without any compulsion.

Upon removal of the cover 14 from the body 2, the biasing force induced by deflection of the U-shaped spring 26 urges the pivot shaft member 20 toward the outside of the body 2, so that the pivot shaft member 20 is again pushed out toward the outside of the body 2. Therefore, when the cover 14 is to be mounted again to the body 2, this can be done by pushing the cover to the body in such a manner that the longitudinal direction of the rectangular hole 30a of the bearing member 30 is coincident with the longitudinal direction of the protuberance 14 of the pivot shaft member 20.

In this embodiment, as set forth above, when the telephone set is used, the cover 14 is set in an inclined state relative to the telephone set body 2, but when the telephone set is placed on a flat surface such as the surface of a desk or the like with the switch portion facing down and in this state a load is applied to the body 2 from the side opposite to the switch portion, the cover 14 opens along the flat surface to prevent damage of the cover. Upon removal of the load or when the telephone set is lifted, the cover returns to its original inclined state automatically.

In the event a load which causes the cover 14 to be opened beyond the angle restricted by the stopper wall is applied to the cover for some reason or other, there is no fear of damage of the cover and the body because the cover is disengaged from the body 2 easily.

Figure 8:
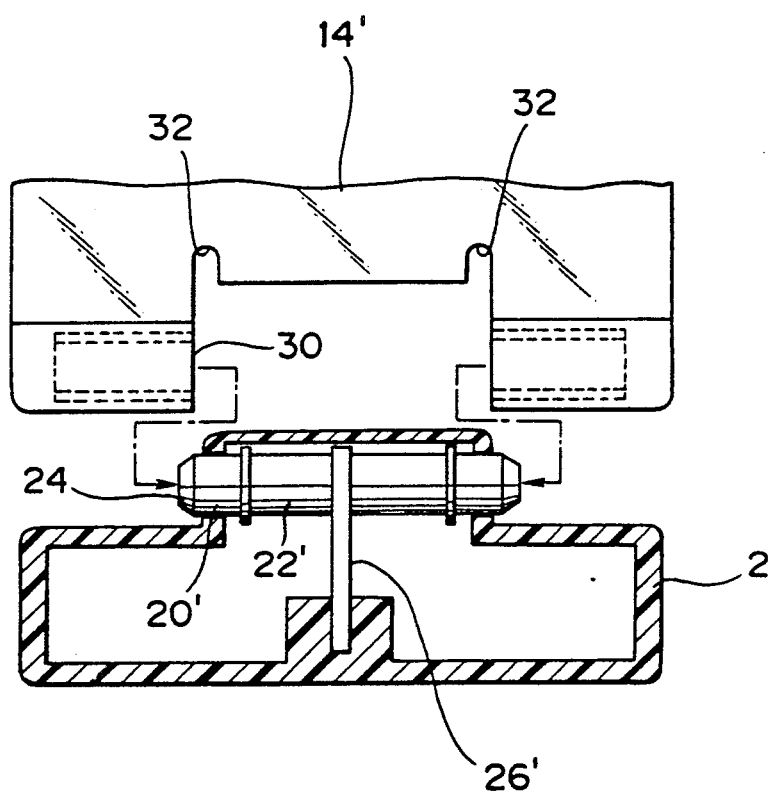
FIG. 8 is a schematic sectional view illustrating another embodiment of a cover holding mechanism.

Another embodiment of a cover holding mechanism according to the present invention will be described below with reference to FIG. 8, in which constructional portions substantially the same as in the above embodiment are indicated by the same reference numerals.

This embodiment is different from the previous embodiment in that a single pivot shaft member 20' is used and plate-like portions 22' are clamped by a U-shaped spring 26', that a cover 14' is formed of a material capable of being easily deformed elastically such as, for example, rubber or soft elastomer, and that slits 32 are formed in the vicinity of bearing members 30 of the cover 14'. Thus, in this embodiment, the pivot shaft member 20' is allowed to be displaced only in its rotating direction, while its axial displacement is not permitted, so that when the user tries to push open the cover 14' up to a position outside a predetermined angular range, the cover can be disengaged from the body 2 easily by elastic deformation.

The reason why the slits 32 are formed in the cover 14' is that it is intended to facilitate elastic deformations of the cover in the above operation. Therefore, some particular material of the cover 14' does not require the formation of such slits 32. Thus, also according to this embodiment it is possible to provide a portable telephone set wherein the cover and the body are hardly to be damaged.

What is claimed is:

1. A portable telephone set comprising:

a body provided with a speaker, a microphone and switch means;

a cover attached pivotably to said body, said cover when closed being adapted to cover at least said switch means and when opened function as a reflective sound collector for the microphone;

stopper means provided in said body to inhibit the cover from rotating at an angle larger than a predetermined angle relative to the body; and cover holding means for holding said cover pivotably within said predetermined angle relative to said body, said cover holding means including biasing means for holding the cover in a stable position in the rotating direction of the cover when the cover is opened, and said cover holding means permitting the cover to be disengaged from the body when the cover is about to be opened forcibly against said stopper means.

2. A portable telephone set according to claim 1, wherein said cover holding means includes a pair of shafts inserted rotatably and axially movably into a pair of holes respectively formed in said body, said shafts each having a plate-like portion on an interior side of said body and also having a protuberance on an exterior side of said body, said protuberance having a trapezoidal section; a pair of U-shaped springs each fixed removably to said body to clamp said plate-like portion of each said shaft, said U-shaped springs functioning to urge said shafts each axially toward the exterior of said body; and a pair of bearing members fixed by secured to an end portion of said cover, said protuberances of said shafts being inserted into said bearing members respectively so that the bearing members rotate integrally with the shafts upon opening and closing of the cover.

3. A portable telephone set according to claim 2, wherein said bearing members each have a hole of a shape which permits fitting therein of said protuberance of each said shaft.

4. A portable telephone set according to claim 1, wherein said predetermined angle is about 180°.

5. A portable telephone set according to claim 1, wherein said cover is formed of an elastic material, and said cover holding means includes a shaft which is inserted rotatably into a pair of holes formed in an end portion of said body, said shaft having a plate-like portion formed centrally thereof and also having a pair of protuberances formed at both ends thereof, said protuberances each having a trapezoidal section; a U-shaped spring fixed removably to said body to clamp said plate-like portion of said shaft; and a pair of bearing members fixed by secured to an end portion of said cover, said protuberances of said shaft being inserted into said bearing members respectively so that the bearing members rotate integrally with said shaft upon opening and closing of the cover.

6. A portable telephone set according to claim 5, wherein said cover has slits formed in positions close to said bearing members respectively.

* * * * *